March 13, 1934.   W. A. BENTON   1,950,963
APPARATUS FOR DETERMINING THE SPECIFIC
GRAVITY OF SOLID SUBSTANCES OR BODIES
Filed July 7, 1930   2 Sheets-Sheet 1

Inventor:- W. A. Benton
Per:- George T. Folkes
Attorney.

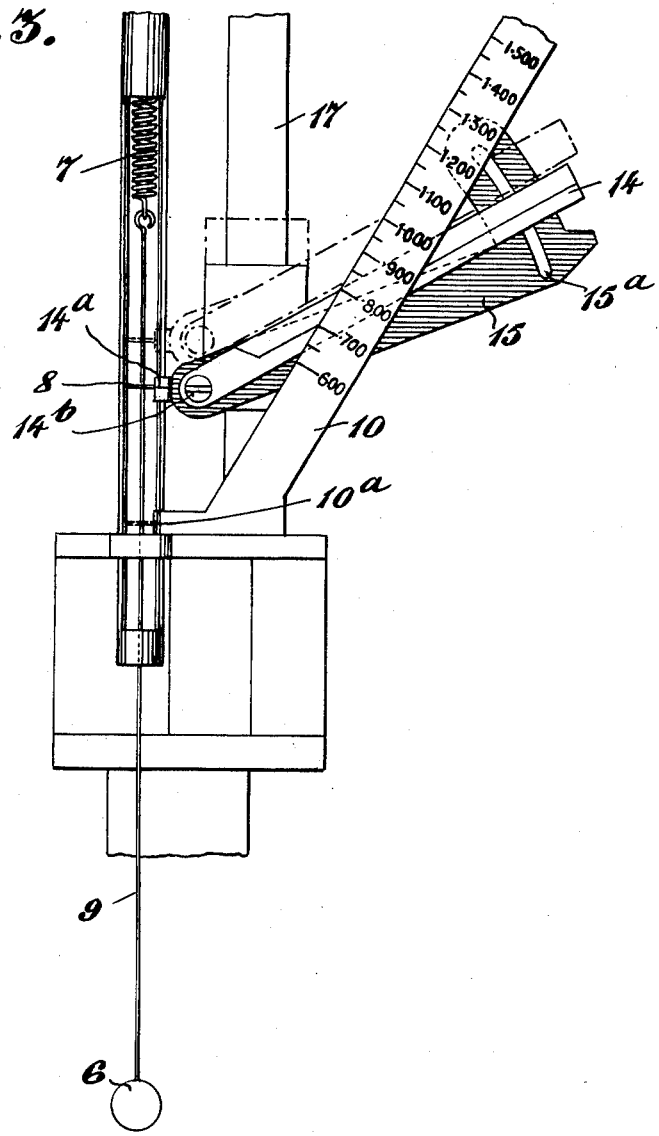

Patented Mar. 13, 1934

1,950,963

UNITED STATES PATENT OFFICE 1,950,963

APPARATUS FOR DETERMINING THE SPECIFIC GRAVITY OF SOLID SUBSTANCES OR BODIES

William Alfred Benton, Birmingham, England, assignor to W. & T. Avery Limited, Birmingham, England Application July 7, 1930, Serial No. 466,078
In Great Britain August 14, 1929

1 Claim. (Cl. 265—44)

This invention has reference to improvements in or relating to apparatus for determining specific gravity and is an improvement in or modification of the apparatus described and claimed in the British patent specification No. 320,416.

The apparatus described in the aforesaid patent specification relates to a means for determining specific gravity by obtaining the weight of a body in air and in water in terms of length equating to unity the difference in length corresponding to the said two weights and which difference is equivalent to the loss of weight of the body in water, and then obtaining the quotient of the weight of the body in air to the loss of the weight of the body in water on a straight line indicator graduated in terms of length by means of a parallel rule device, whereby the quotient which corresponds to the specific gravity, is read off on the graduated straight line indicator.

The present invention has for its object an improved and modified apparatus of the aforesaid kind whereby the specific gravity of liquids, solids heavier than water, and solids lighter than water, can be determined with rapidity and accuracy.

The invention will now be described with reference to the accompanying sheets of drawings in which similar reference numerals indicate similar parts in the several views:—

Figure 3 illustrates in part sectional elevation, to an enlarged scale, part of the mechanism seen in Figure 1.

Figure 1:
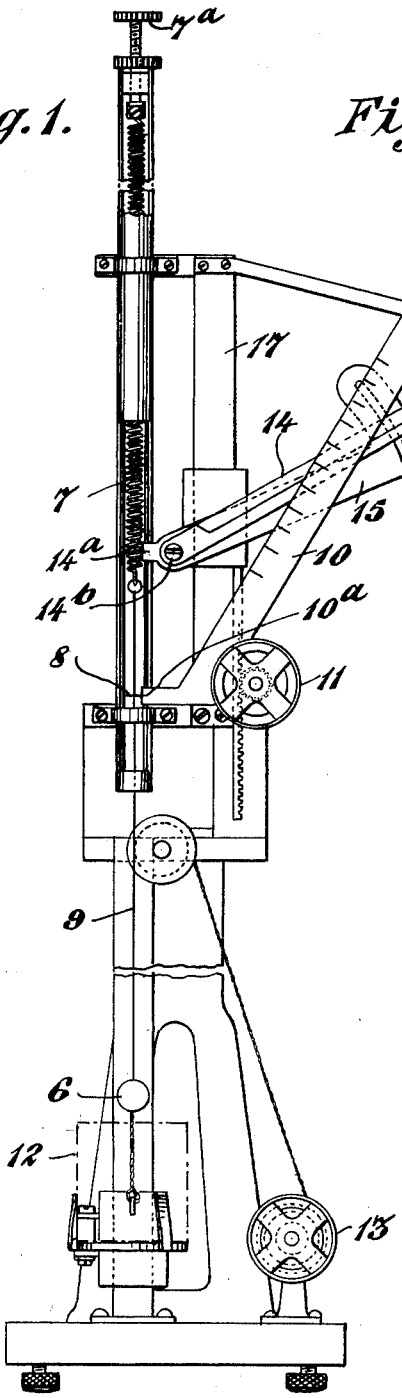
Figure 1 is a part sectional front elevation of the apparatus as adapted for ascertaining the specific gravity of liquids.
Figure 2:
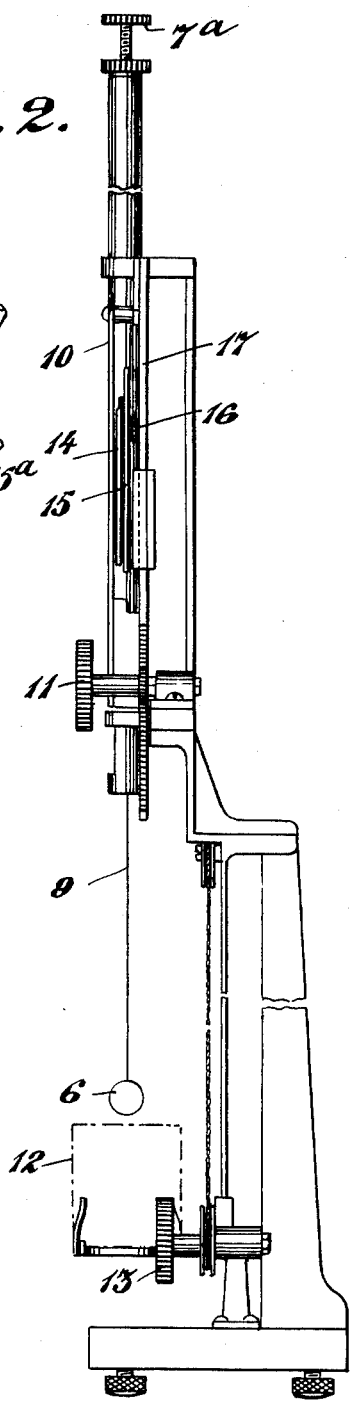
Figure 2 is a part sectional side elevation of Figure 1.

The weight of a standard body 6 in air is first ascertained against the resistance to elongation of the calibrated coil spring 7 and is denoted by the position of the disc 8 mounted on the suspension wire 9 connecting the coil spring with the body 6. The graduated scale bar 10 is fixed in a position determined by the weight of the body 6 in air and any adjustments necessary to bring the disc 8 into registry with the index 10$^a$ on the bar 10 is obtained by means of the screw 7$^a$ which constitutes the mounting for the upper end of the coil spring 7. This adjustment determines the position of the parts of the apparatus for the commencement of a series of tests under the same conditions.

The standard body 6 is then immersed in water in the vessel 12 which vessel can be adjusted in height through rotation of the knob 13 in a similar manner to that described in the prior specification. Then the mounting 15 which has an arm 14 pivotally connected thereto is vertically adjusted by means of the knob 11 through rack and pinion gearing until the index mark 14$^a$ registers with the new position taken up by the disc 8 (see dotted line position in Figure 3) the arm 14 being then angularly adjusted about the pivot 14$^b$ on its mounting 15 by means of the set screw 16 engaging within the slot 15$^a$ in the mounting so that the reading edge on the arm 14 is made to intersect the graduated bar 10 at the indication 1.000 in order to equate to unity the difference between the weight of a body in air and in water.

Now in order to ascertain the specific gravity of another liquid, say, an oil, the body 6 is immersed in the oil to be tested which is contained within a vessel such as 12 which can be substituted for the vessel which contained the water. The mounting 15 together with the arm 14 is then adjusted on the vertical bar 17 to the position indicated in full lines in Figure 3 in which the index mark 14$^a$ is again in register with the disc 8 when, by reading the intersecting point between the arm 14 and the bar 10, an indication of the specific gravity of the oil is obtained. In the example illustrated in the drawings it will be observed that the specific gravity is .800.

What I claim is:—

An apparatus for determining specific gravity comprising in combination a suspended coil spring, means for adjusting the height of the suspension point of the spring, an index supported from the free end of the spring, a graduated scale bar carrying an index mark for registry with the said index, a movable mounting also carrying an index mark for registry with the index, means for effecting a vertical adjustment of the mounting, an arm pivotally connected to the mounting, and means for fixing the arm at a set angle of inclination relatively to the mounting whereby the said arm and mounting may be moved together with the arm and maintained in the set position, said arm in conjunction with the graduations on the scale bar providing the means for reading off the specific gravity when the sequence of operations prescribed for using the apparatus has been performed.

WILLIAM ALFRED BENTON.